United States Patent [19]

Ryan et al.

[11] Patent Number: 5,018,075

[45] Date of Patent: May 21, 1991

[54] UNKNOWN RESPONSE PROCESSING IN A DIAGNOSTIC EXPERT SYSTEM

[75] Inventors: Charles P. Ryan, Phoenix; Thomas H. Howell, Scottsdale; Andrew Y. Pan, Phoenix, all of Ariz.; David W. Rolston, Santa Cruz, Calif.

[73] Assignee: Bull Hn Information Systems Inc., Phoenix, Ariz.

[21] Appl. No.: 328,380

[22] Filed: Mar. 24, 1989

[51] Int. Cl.$^5$ .............................................. G06F 15/18
[52] U.S. Cl. ..................................................... 364/513
[58] Field of Search ........................................... 364/513

[56] References Cited

U.S. PATENT DOCUMENTS

| | | | |
|---|---|---|---|
| 4,860,213 | 8/1989 | Bonissone | 364/513 |
| 4,860,214 | 8/1989 | Matsuda et al. | 364/513 |
| 4,912,648 | 3/1990 | Tyler | 364/513 |
| 4,967,368 | 10/1990 | Bolling et al. | 364/513 |

Primary Examiner—Michael R. Fleming
Assistant Examiner—Ayaz R. Sheikh
Attorney, Agent, or Firm—James H. Phillips

[57] ABSTRACT

A diagnostic expert system incorporating a cause-effect graph is disclosed in which "yes", "no" and "unknown" are valid possible responses to a query. Each node in the graph is assigned a local decision factor (LDF) based on a given node's desirability for selection during best-first search and a collapsed decision factor (CDF) based on the average values of the LDFs for all its daughter nodes. For a current node being processed, a list of all its daughter nodes is obtained and examined to remove all daughter nodes that have been visited before in the current transition and all daughter nodes which have prerequisites that are not met. Then, the daughter node with the largest LDF is selected and its test function is executed. If the user response is "yes", the daughter node is made the current node, and a list of its daughter nodes is obtained to continue the process. If the user response is "no", the daughter node is added to the closed list, and the process continues with the next daughter node of the current node. If the user respoanse is "unknown", the daughter node's CDF is compared with the LDFs for the other daughter nodes of the current node which are not on the closed list and which have their prerequisites met. If the CDF is larger than all the LDFs, the daughter node is made the current node to continue the process; otherwise, the daughter node with the largest LDF is selected, and its test function is executed to continue the process.

4 Claims, 6 Drawing Sheets

UNKNOWN RESPONSE PROCESSING IN A DIAGNOSTIC EXPERT SYSTEM

FIELD OF THE INVENTION

This invention relates to the art of computer programming and, more particularly, to a diagnostic expert system which incorporates procedures for processing an "unknown" response to questions posed during a consultation session.

BACKGROUND OF THE INVENTION

An important class of expert systems is that of diagnostic systems which is characterized by an interactive "consultation" between a user and the system in order to determine the cause of one or more problems associated with a given subject. The system poses a series of questions to the user, these questions typically requiring yes/no responses or responses (such as test value) which the user has determined by observing the subject of the consultation.

Unfortunately, it is sometimes impossible to respond straightforwardly to a given question because the expert system user simply does not know and cannot get the answer to the question. Such a condition may arise, merely by way of example, when the subject is electronics equipment situated at a site remote from the expert system user who is in communication with an individual at the site, and that individual is not sufficiently skilled to provide an answer. Many other examples of circumstances leading to the inability to answer a given question posed by a diagnostic expert system will occur to those skilled in the art.

When the "unknown" response situation has occurred during consultations employing other diagnostic expert systems, some have simply aborted the consultation while others have used rigorous mathematical rules of probability to help make decisions in the face of uncertainty. However, the former is unsatisfactory while the latter may not achieve the highly desirable goal of approximating what a human expert would do when faced with the same dilemma.

OBJECTS OF THE INVENTION

It is therefore a broad object of this invention to provide an improved diagnostic expert system.

It is another object of this invention to provide a diagnostic expert system that is capable of continuing and successfully concluding a consultation when not all symptomatic aspects of a problem condition for a given subject can be ascertained.

It is a more specific object of this invention to provide a diagnostic expert system which closely approximates the decision process a human expert would employ when an "unknown" response to a question posed is encountered during a consultation.

SUMMARY OF THE INVENTION

Briefly, these and other objects of the invention are achieved by a diagnostic expert system incorporating a cause-effect graph in which "yes", "no" and "unknown" are valid possible responses to a query. Each node in the cause-effect graph is assigned a local decision factor based on its desirability for selection during best-first search of the cause-effect graph and a collapsed decision factor based on the average values of the local decision factors for all the node's daughter nodes. For a current node under examination, a list of all its daughter nodes is obtained and examined to remove all daughter nodes that have been visited before in the current transition and all daughter nodes which have prerequisites that are not met. Then, the daughter node with the largest local decision factor is selected, and its test function is executed. If the user response is "yes", the chosen daughter node is made the current node, a transition and a list of its daughter nodes is obtained to continue the process. If the user response is "no", the daughter node is added to the closed list, and the process continues with the current node, its next eligible daughter node being selected. If the user response is "unknown", the daughter node's collapsed decision factor is compared with the local decision factors for all the other daughter nodes of the current node which are not on the closed list and which have their prerequisites met. If the collapsed decision factor is larger than all the local decision factors, the daughter node is made the current node to continue the process whereas, if the collapsed decision factor is not larger, then the daughter node with the largest local decision factor is selected, and its test function is executed to continue the process.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

While it will become clear to those skilled in the art that the invention finds wide use in diagnostic expert systems generally, a diagnostic expert system for assisting in the maintenance, recovery and (particularly) troubleshooting of a mass disc storage unit employed in the information processing industry has been chosen for the purpose of illustrating and explaining the invention.

Figure 1:
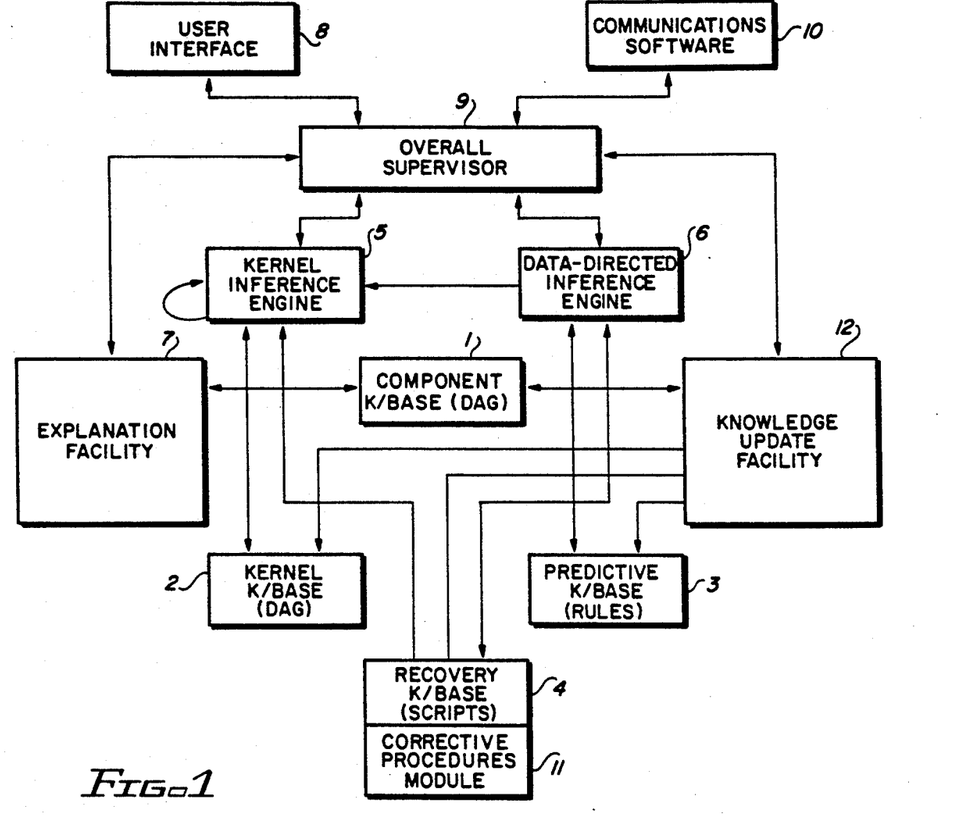
FIG. 1 is a block diagram illustrating the architecture of the subject expert system.

The fundamental architecture of the illustrative diagnostic expert system is symbolized in the block diagram of FIG. 1. The component knowledge base 1, kernel knowledge base 2, predictive knowledge base 3 and recovery knowledge base 4 are the four components which contain the domain knowledge that is required to perform each of the major system functions. The component knowledge base 1 and the kernel knowledge base 2 are implemented as directed acyclic graphs (DAGs) while the predictive knowledge base 3 is implemented using rules, and the recovery knowledge base is procedural and relies on the use of script-like structures. Although each knowledge base is maintained as a separate entity, it is possible that the activity that occurs during any given consultation may require the use of knowledge from more than one knowledge base as the activity moves from one major function to another. For example, a user may begin by performing troubleshooting activities and then move into a system recovery phase after a problem has been detected and corrected.

The kernel inference engine 5 is one of the mechanisms used to apply the appropriate knowledge to a problem situation. The knowledge supplied to the kernel inference engine 5 will come from either the kernel knowledge base 2 or the predictive knowledge base 3. The inference strategy is goal-directed search that operates by attempting to prove a selected hypothesis. The data-directed inference engine 6 is similar to the kernel inference engine 5 except that its inference strategy is forward-directed based on data interpretation. Rather than attempting to prove a selected hypothesis, it undertakes to establish all possible reasonable interpretations of a given set of data. The knowledge used by the data-directed inference engine 6 comes from the predictive knowledge base 3.

The explanation facility 7 describes the system's reasoning process to the user. THe user interface 8 is generally interactive and menu-driven; it provides information to the user, receives responses from the user and allows the user to "back up" the process when required. The overall supervisor 9 provides overall coordinating for the system. It decides which knowledge base(s) and engine(s) should be used for any given situation and coordinates the flow of information to and from the explanation facility 7 and the user interface 8. The communications software component 10 allows a remote user to access the system through an appropriate terminal and communications system. The corrective procedures module 11 is a general collection of the detailed procedures that are required to recover from specified problems. The information contained in this module is used to repair faults rather than to recover from fault-induced media or file problems.

The knowledge update facility 12 assists in the process of revising the knowledge bases. It provides a powerful editing and analysis capability which permits an expert to update the knowledge base without he help of a knowledge engineer.

The expert system illustrated in FIG. 1 performs several diagnostic functions. In keeping with other hardware diagnostic expert systems employed in the information processing industry, it assists maintenance personnel in three general areas: predictive maintenance, media and file recovery and troubleshooting. In each of these areas, there are a limited number of experts who, through study and experience, have developed extensive knowledge regarding the particular piece of equipment with which the expert system is to be associated in its diagnostic function. A significant part of this specialized knowledge is captured, articulated and stored in a usable form in the illustrative expert system; however, the subject invention is particularly employed in the troubleshooting facility of which it is a very powerful tool.

Figure 2:
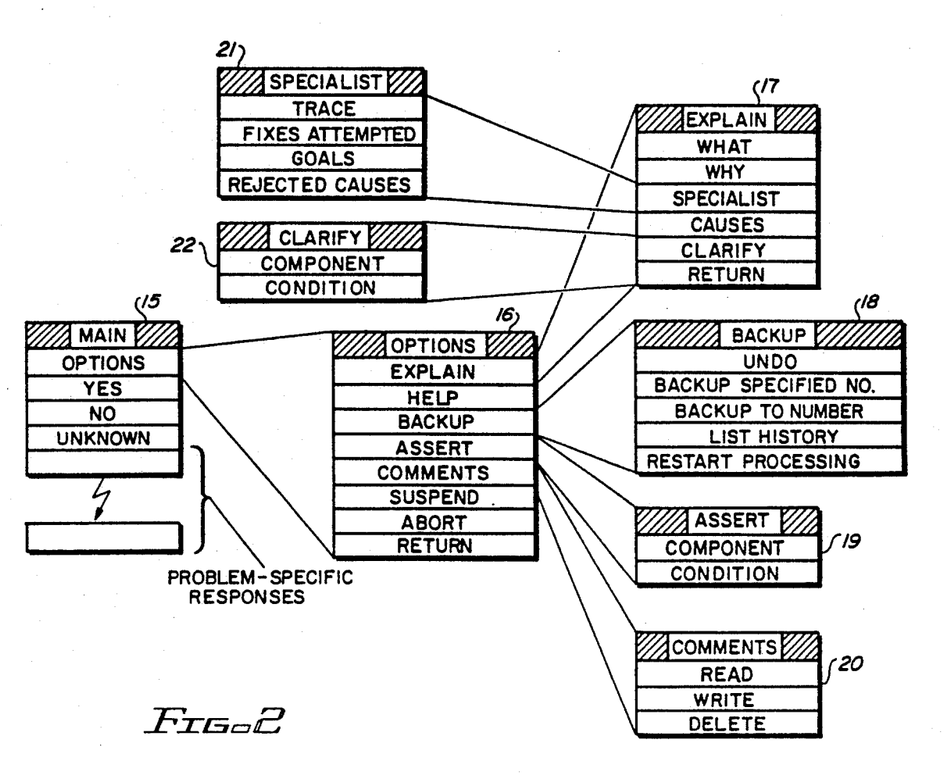
FIG. 2 is a graphic representation of the menu interface system available during a consultation.

Therefore, it will be understood, as the description proceeds, that the troubleshooting facility of the exemplary expert system has been invoked by the user and that the user interfaces with the menu set graphically illustrated in FIG. 2. During a troubleshooting consultation, the user will usually be interfacing with the main troubleshooting menu 15 which offers the following choices:

OPTIONS which brings up the secondary option menu 16 which will be discussed below;

YES which means that the user is reasonably sure that the answer to a question posed by the expert system is "yes";

NO which means that the user is reasonably sure that the answer to a question posed by the expert system is "no";

UNKNOWN which indicates that the user is unable to answer the question posed by the expert system; and PROBLEM SPECIFIC RESPONSES which allow the user to provide information that is unique to the problem that is being analyzed; for example, "flickering" is a possible response to the question: "Is the LED lit?"

Those skilled in the art will appreciate that the inclusion of "unknown" as a possible response is extraordinary, and the processing of this response is the essence of the subject invention. As a result, it will be treated in detail below; however, the remaining elements illustrated in FIG. 2 will first be discussed to illuminate the environment in which the invention is employed.

If "OPTIONS" is selected in response to a question during a consultation, the secondary options menu 16 with its selections appears at the user interface for the choice of the user. These selections include:

EXPLAIN which calls the explain submenu 17 by the use of which an explanation of what the system is doing and why it is doing it may be obtained;

HELP which provides the user with assistance in gathering information that has been requested by the system;

BACKUP which calls the backup submenu 18 by the use of which the user may return to a previous question and begin processing from that point;

ASSERT which calls the assert submenu 19 by the use of which a user may initiate processing by asserting unrequested information in order to allow mixed-initiative interaction which consequently permits the user to start processing in "mid-stream" rather than following the system-prescribed sequence of questions;

COMMENTS which calls the comments submenu 20 by the use of which the user may read, write or delete any desired freeform comments such as suggestions, criticisms and additional diagnostic information;

SUSPEND which allows the user to suspend a consultation in a manner that will allow resumption from the point of suspension at a later time;

ABORT which causes a hardcopy of the consultation session to be dumped to a printer, clears the screen and terminates the program; and RETURN which returns the user to the main troubleshooting menu 15, The explain submenu 17 includes SPECIALIST and CLARITY choices which respectively call a specialist submenu 21 and a clarify submenu 22. The facilities accessible through the specialist submenu 21 provide more in-depth use of the system than is ordinarily available, and are intended for use only by users who understand the systems goal-stack and chronological backtracking strategy. These facilities include:

TRACE which provides a listing of the trace of activity that has occurred during the current consultation;

FIXES ATTEMPTED provides a listing of the repair actions that have been attempted during the current consultation;

GOALS provides a listing of all the goals on the goal stack and symptoms on the symptom list; and REJECTED CAUSES provides a list of those potential causes that have been investigated and rejected.

The clarify submenu 22 provides a more detailed description of the COMPONENT names or CONDITIONs (states) that are used in the consultation questions. This facility is provided to help overcome any difficulty that might arise from the lack of a common vocabulary.

The fault resolution kernel employed in the exemplary system is based on the concept of abductive reasoning. Unlike deduction (where given the rule A→B, B is deduced by observing A) it is (perhaps dangerously) concluded that A is true by observing B. Thus, unlike deduction, abduction is a form of plausible inference and is not sound in that it is quite possible to draw invalid conclusions based on abduction. (As an example, while it is likely that an armed person running from a bank is a bank robber, it is certainly not an absolute fact.) Given A→B, upon observing B, it can be hypothesized that A is true as a way of explaining the situation that has been observed. Tied into this concept is the notion of causality: A is believed to be true because it is known that A causes B. This concept is applied operationally by using an approach that is analogous to the scientific method.

Figure 3:
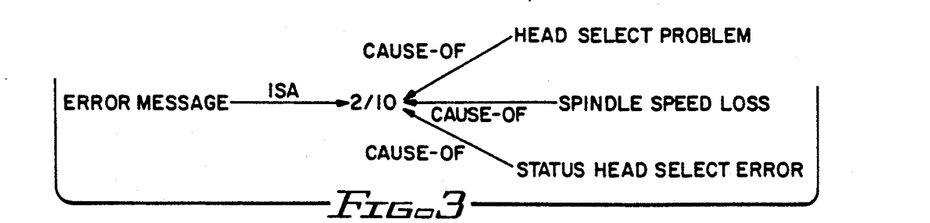
FIG. 3 illustrates a simple associative network.

Briefly, a hypotheses is formed based on observations and knowledge of causality relationships. Tests are then conducted, and additional evidence is gathered, the results serving to strengthen belief or disbelief in the conclusion. Given sufficient evidence, it is concluded that the hypothesis is true. The fault resolution kernel applies this concept in the form of cause-effect reasoning where specific causes are hypothesized to explain observed event. For example, FIG. 3 shows a simple associative network composed of "cause of" and "is a" relationships for three different faults (spindle problem, loss of air pressure, electrical power failure) that can cause a "2/10" console error message (a user visible effect).

A characteristic of most diagnostic domains is the occurrence of "cascading errors" in which the effect of the primary fault is to cause some intermediate problem which is turn causes another intermediate problem until visible symptoms are eventually produced. For example, a "2/10" error message is displayed if there is a problem with the main spindle in the drive unit. A spindle problem is the effect of an intermittent loss of spindle speed or the fact that the spindle has stopped turning. The spindle can stop turning for many different reasons including the failure of the spindle drive motor. Considering this characteristic, the kernel knowledge base 2 (FIG. 1) is composed of two segments: the classification segment that breaks down general error classes (e.g., "error message") and the cause-effect segment which is based on the cause-effect analysis described above.

Figure 4:
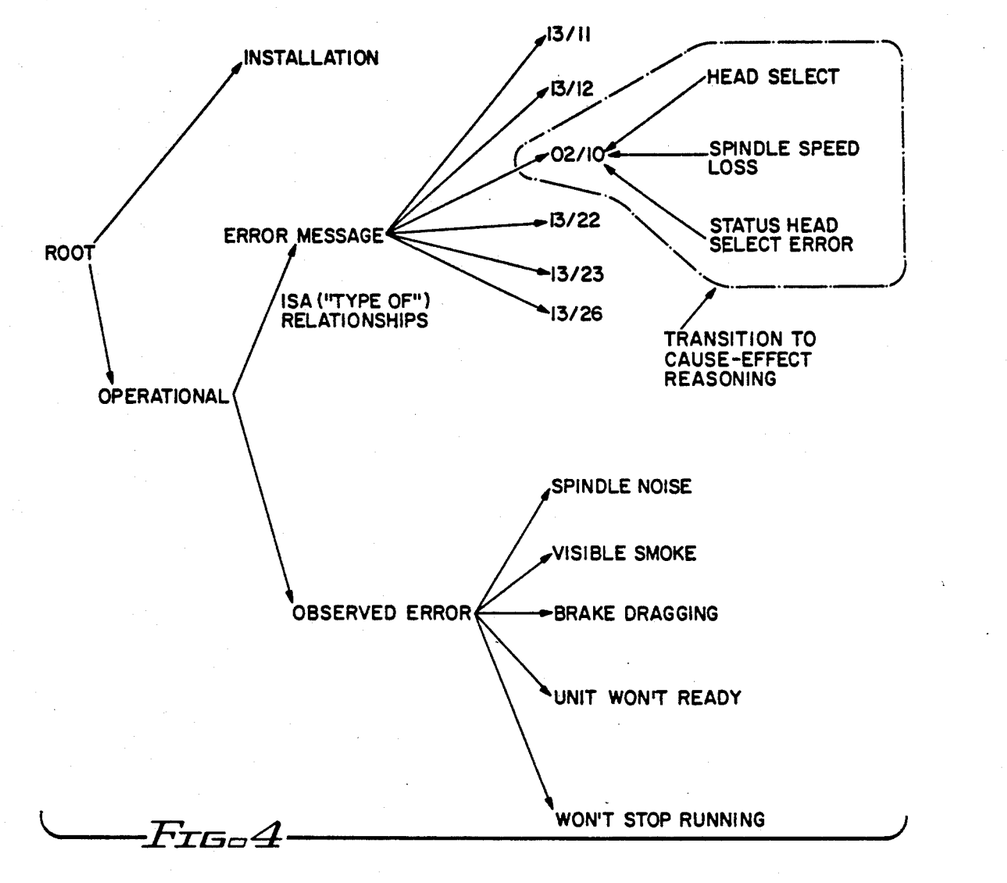
FIG. 4 shows an example of the classification segment of the kernel knowledge base network.
Figure 5:
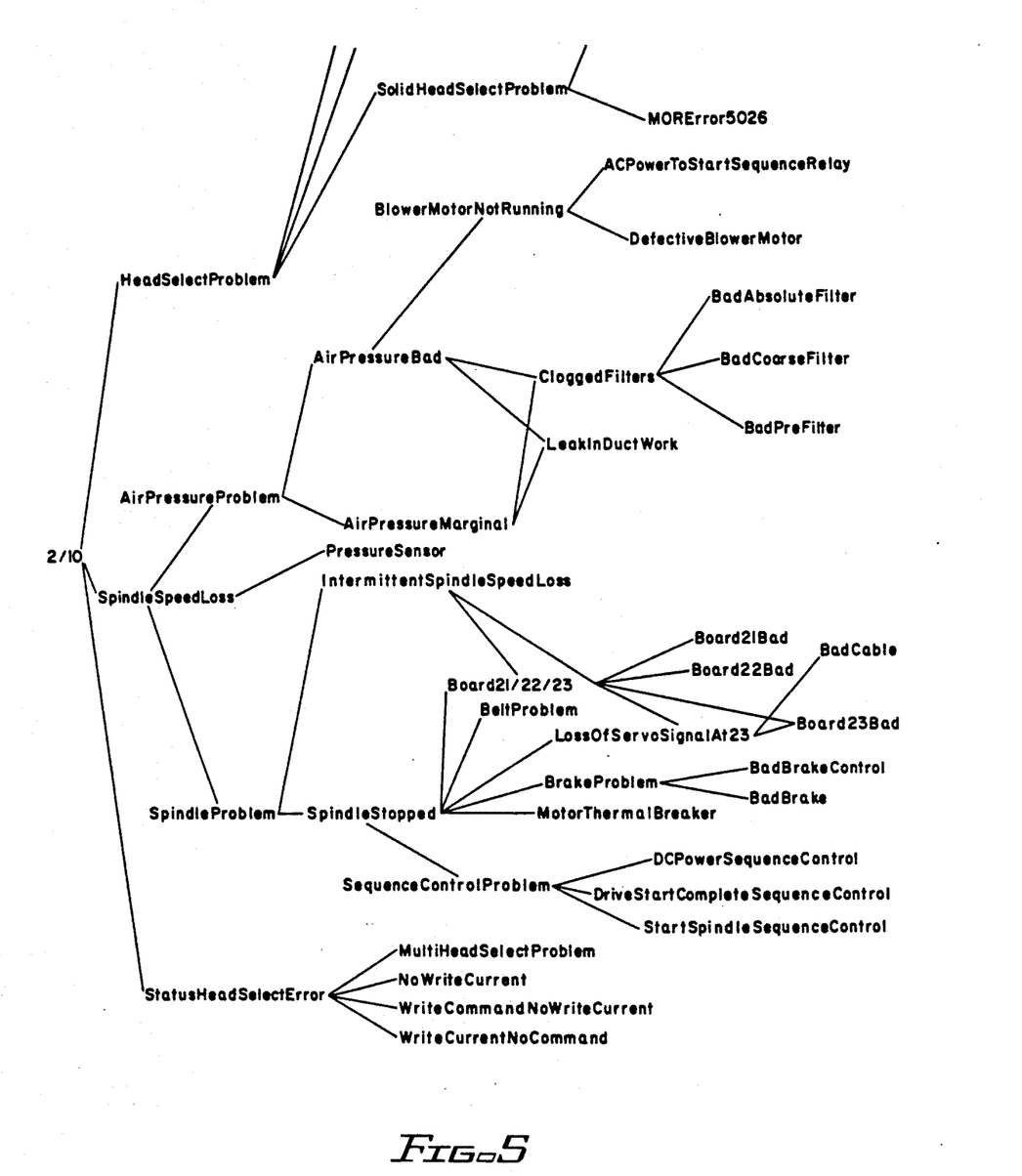
FIG. 5 shows a section of the cause-effect segment of the kernel knowledge base network for an exemplary error message.

FIG. 4 shows an example of the classification segment. This portion of the network is used to collect the initial problem symptoms. There is no form of "search" conducted for this part of the graph; the user is simply asked to identify the symptoms using the menus described above. FIG. 5 shows a section of the cause-effect graph for a "2/10" error message in exactly the form that it is presented by the kernel knowledge base editor. It is important to remember that the kernel knowledge base is, in general, a graph since any given cause can have many effects and any given effect can have many causes.

The kernel knowledge base implementation consists of the following components:

(A) a collection of network nodes, each of which has associated with it:
  1. a "test procedure" for establishing the truth value of the node;
  2. a fix script that is used to direct repair actions for the node if it is a final cause (leaf node); and
  3. an attribute frame;

(B) links among the nodes; and (C) an inheritance hierarchy for the overall network.

The network is implemented as a class-lattice structure using object-oriented programming. Each node is represented physically as a class in the lattice. The "test procedure" is a function that describes the actions to be taken to establish the truth value of the corresponding node. This procedure requests the user to take various actions and enter the results. These actions may include such things as executing tests, contacting the owner of the equipment for information, making observations, etc. There are nodes that have no test function either because the node is an "organizational node" that is used to structure the network and has no physical significance or because there is no test available for a given condition.

Each attribute frame includes a number of "slots" that contain information that is either local to the particular frame or inherited from a higher frame. These slots include:

(A) Name of Creator Expert;

(B) Date and Time of Creation;

(C) Date and Time of Last Modification;

(D) Local State Description—A formal logic representation of the state represented by this node;

(E) Local State Value—The value for the state represented by this node is established through the execution of test procedures that evaluate the value of the predicates in the formulas contained in the local state description; values can be true, false or not determined; they can also be established by inference from other formulas; the initial inherited default value is not yet determined;

Test Impact Factor (TIF)—This is an integer value, with a range of 0–10, that describes the potential negative impact of the testing required to establish the truth value of this node; impact, in this sense, can include such things as the time required to run the test, the cost of materials consumed by the test (i.e., replacing parts) or the requirement that the disc system under analysis be released prior to test; a value of 10 corresponds to severe impact, and a value of 0 corresponds to no impact; this slot inherits a default value of 5 at the time of the node's creation, and the expert assigns an actual value based on experience if there is reason to believe that the default value is not appropriate.

Likeliness Factors (LF)—A likeliness factor is a value with a range of 0–10 that describes the likeliness (pseudo-probability) that this node is actually the cause of the observed effect; a value of 10 corresponds to "highly likely" and a value of 0 to "highly unlikely"; the value for this slot is a list of likeliness factors, one for each effect associated with this cause; each likeliness factor is assigned by the expert based on experience;

Local Decision Factor (LDF)—A heuristic selection factor that represents how desirable the node is for selection during best-first search of the cause-effect graph; this value is calculated by a heuristic evaluation function that combines LF and TIF (desirable nodes are those with high likeliness and low impact);

Collapsed Decision Factor (CDF)—A selection factor that is used to estimate the desirability of a node when a LDF is not available (e.g., because there is no test available); this value is calculated by combining and "averaging" the CDFs for all the node's daughter nodes using a collapsing technique similar to that used to develop cut-off factors in alpha/beta pruning; if a node is a terminal node, its CDF is made the same as its LDF;

Name of Test Procedure—This slot contains the name of the test procedure that describes the actions to be taken to establish the Local STate Value (e.g., an attached "when required" function; this procedure request the user to take various actions and enter the results; these actions may include such things as executing tests, contacting the owner of the equipment for information, making observations, etc.; when no test is available, the value of this slot is "none" which is the default value;

Name of Fix Procedure—This slot contains the name of the script-like structure that contains the procedures that are required to repair the fault associated with this node; the default value is the name of a script that simply directs the user to swap all components associated with the node;

Fix-Attempted Flag—A flag that indicates that the fix procedure associated with this node has already been executed during this session;

Verification Information—Date and time the expert verified this node;

Comments—Freeform comments inserted by the developer that relate in any way to this node;

Secondary Action Pointer—A list of secondary effects associated with this node; the inherited default value is nil;

Prerequisites—A list of all nodes which must be tested prior to this node (e.g., it is possible to damage the media if the read/write hardware is not verified before the media tests are executed; any values inserted in this slot are inherited to all frames lower in the network;

Organizational Node Flag—A flag that indicates that the associated node is an organization node; such nodes are used only to structure the network and have no direct physical significance; and Node Explanation—The explanation of the semantics of the node that is provided at the user's request.

An important secondary use of frames and inheritance is to provide software configuration management (hardware version control in the example) for the system. Version control is a classical problem in software engineering and, more particularly, in software systems that address hardware as a target application. The functionality of the subject system, i.e., the specific tests and repair actions that are recommended, vary depending on the version of the mass storage hardware, the version of the test and diagnostic procedures that are available, and the version of the operating system employed.

Figure 6:
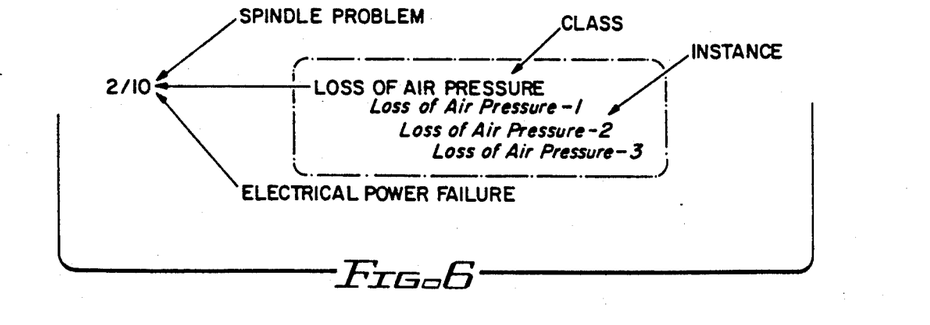
FIG. 6 show an example of version control as implemented in the system.

Version control is accomplished by using different instances of cause-effect nodes to represent the knowledge associated with different configurations of hardware, test software and operating system software. An example is shown in FIG. 6. The class nodes represent the test and repair knowledge that applies to the "base version configuration" (the collection of hardware/T & D/operating system versions that occurs most commonly in the field). Instances of a given node are created whenever the value of any slot in the node depends on the version configuration that is being used at the subject site. Default values for the slots in the instance frame are inherited from the class frame, and exception conditions for the particular version-configuration are stored in the instance.

Figure 7:
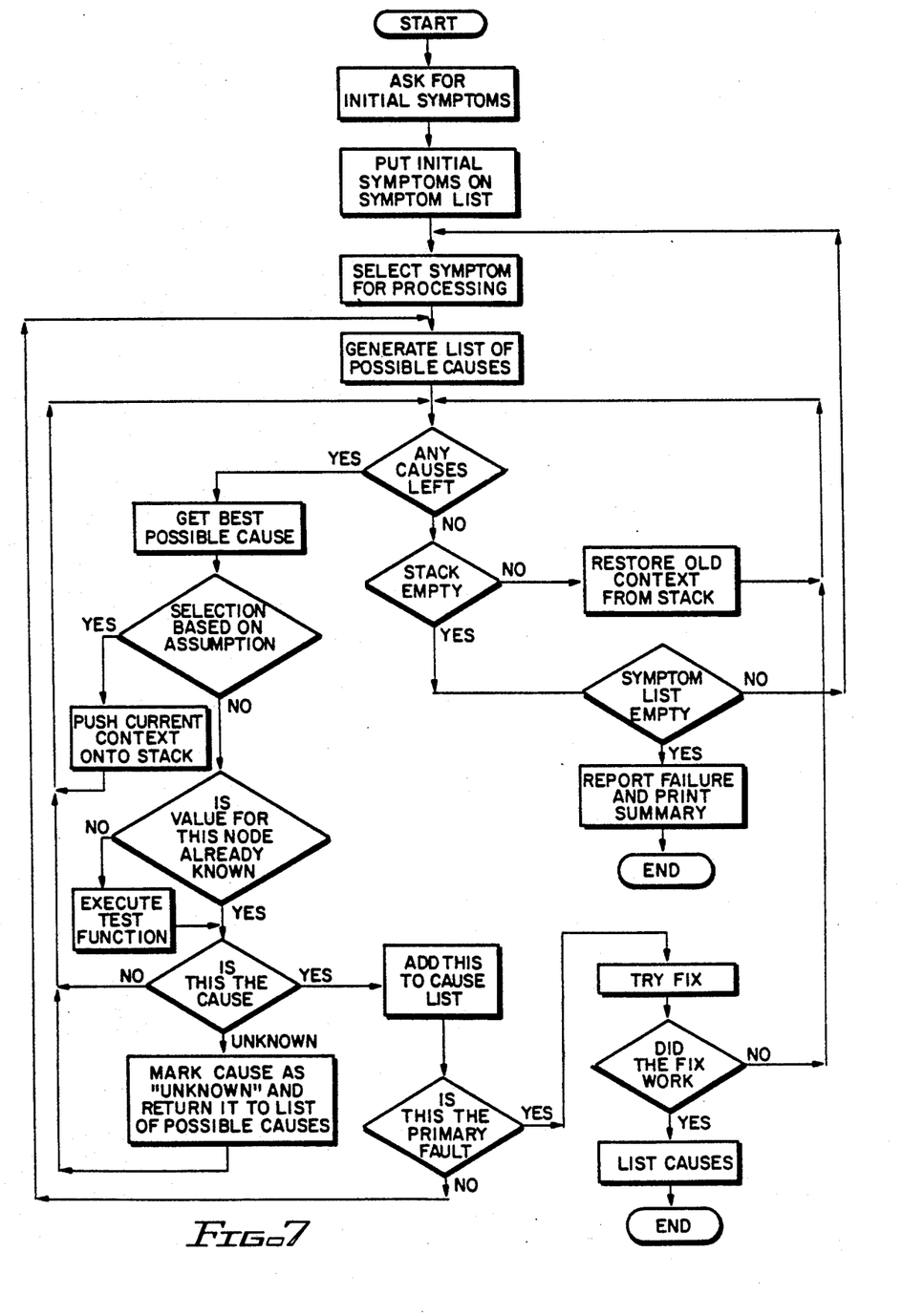
FIG. 7 is a flowchart of the inference activity for the problem resolution kernel.

A flowchart of the inference activity for the problem resolution kernel is shown in FIG. 7. The process begins with the collection of initial symptoms which can be either error messages or observed problems. The user selects any number of symptoms from these two categories using symptom menus.

The initial symptoms are then evaluated to select one primary symptom that will be the starting node for the search process. This selection process operates by first identifying the most probable cause of all the observed symptoms. This cause is identified as the cause that is a potential source of the greatest number of symptoms. The symptom that is selected as the start symptom is any symptom that is an effect of the most probable cause. The remaining symptoms are placed on a "symptom list" ordered by their CDFs. Ties that occur anywhere in this process are broken by arbitrary selection.

Once the primary symptom has been identified, the process is based on the systematic selection and test of possible causes for a given effect. Once the cause of a given effect is identified, the process "moves" to the new cause and is recursively restarted with the newly identified cause being treated as an effect. Multiple original symptoms are used in only two ways during the search process: (1) during the selection of the best candidate node for expansion, those nodes that relate to multiple observed symptoms are preferred; and (2) when the search process that emanated from the original primary symptom fails, a new primary symptom is selected from the symptom list (without further user interaction).

This form of search, which focuses on one primary starting symptom, is in contrast to the more sophisticated techniques used in some diagnostic systems such as those (typically employed in the art of medicine) which periodically quantitatively update belief based on evidence accumulated from multiple symptoms. This contact can best be understood by considering each of these search processes as being versions of heuristic generate-and-test (in a very general sense). The issue is the extent to which the process will emphasize the generator vs. the tester. In the case of the system mentioned above which periodically updates the belief, the generation process considers the accumulating weight of the evidence that supports any given cause by continuously referring to all available symptom information. This approach emphasized the generator and attempts to avoid generating invalid solutions. In the case of the subject system, the emphasis moves toward the tester. This results from two primary factors:

(1) it is much easier to test electronic equipment or the like than humans (e.g., test results tend to be more definitive, and it is possible to "shotgun" problems by systematically replacing parts); and (2) multiple independent faults are relatively infrequent in electronics equipment and the like (as contrasted with the human situation where the possibility of multiple diseases is very important).

In the subject system, multiple symptoms are accepted; however, it is not specifically intended to address multiple independent faults. (In many cases, multiple independent faults will be corrected, but in other cases, they will not.)

The selection process that is conducted after the primary symptom is identified is based on depth-first search of the cause-effect graph. In the selection of the "best" node to analyze at any given point, those causes that connect to multiple symptoms are preferred. When "multiple-symptom" causes are not present (or to choose between several "multiple-symptom" causes), selection is based on a comparison of decision factors that are generated for each node through the use of heuristic evaluation functions described previously.

In this selection process, LDFs are used to represent nodes when possible. CDFs are used to estimate the desirability of collection nodes, nodes that have no test procedure and nodes that are marked as "unknown" because a previous execution of the test procedure (during the current consultation) produced a result of "unknown".

An "unknown" response results from the fact that the user is unable to gather test results for some reason. The system operation in the face of an "unknown" response is, again, the essence of the invention. It allows the system to continue processing in the face of uncertain or incomplete information where other diagnostic expert systems would fail and abort the consultation. It is very important to realize that the presence of this feature implies that even if the system is perfectly implemented, it may produce advice that is "incorrect". For example, the system may recommend the replacement of a circuit board that is not actually defective. This advice is "incorrect38 in the sense that it doesn't actually fix the problem, but is "correct" in the sense that it is the best possible advice given the situation and information available; i.e., the same advice that a human expert would have given under identical circumstances.

After the best candidate cause is processed, it is either accepted (in which case the search process moves to the new node and recursively restarts itself) or is rejected (in which case the next candidate cause is investigated. Nodes are accepted based on positive definitive test results or based on an unsupported assumption (e.g., the system may decide that the best move is to "guess" when no test is available or the user answers "unknown" in response to a test query).

Any number of assumptions are accepted until a node is reached where all possible causes have been tested and rejected; i.e., a dead end has been reached. Chronological backtracking is employed to recover from bad assumptions. In this case, chronological backtracking, in spite of the fact that it is relatively inefficient, is adequate because the typical causal chains are relatively short, typically no more that five links.

In theory, it would be most efficient to base the system inference on a best-first search where a given branch may be abandoned in favor of expanding a higher level node that was previously rejected. The subject system is, however, based on depth-first search (where a new original symptom is expanded only after search based on the original primary symptom has reached a dead end) primarily because technicians tend to do depth-first troubleshooting and find it difficult to understand why the system "jumps around" while doing best-first search.

Consider now an exemplary consultation using the subject system which has been charged with the knowledge bases pertaining to a family of disk mass storage units:

```
Fri Jan 20 13:17:40 1989

Welcome to PERMAID tm

Please enter the site ID (2 alpha & 4 digits)CE0012

Please enter your clock number ( 5 digits )16074 customer ID    --> CE0012
     employee number    --> 16074

Are the above entries correct? (Y/N)y

Do you want to resume an old session? (Y/N)n

Will use file /SUSPEND3 as the suspend file.
```

```
T -> Troubleshooting
I -> Interpreter (extended status/media errors)
M -> Media Repair & Recovery
H -> HDA Checkout Procedure
O -> Observed HDA Problems
F -> Fault Dictionary
W -> Write Permission
P -> Pcopy
A -> Address Conversion
C -> Servo Checkout Routine

???T

E -> Error Message
O -> Observed Error
B -> Both

???E

Respond to the GEPR option request with an 'S'

Which of the following do you have?

A -> Octal Seek Address
L -> Logical Cylinder/Head/Sector
P -> Physical Cylinder/Head/Sector
N -> Neither

???A

Which type of disk drive?  (500/501/509)501

Are all the addresses on the same logical device? (Y/N)Y

Is it an even or odd device number? (E/O)O

What is the octal seed address?1237677

The address is 1237677.  Is this correct? (Y/N)y
```

DEVICE SUMMARY

```
The device is an.................MSU501
The octal seek address is.......1237667
The cylinder is..................268
The head is......................14
The sector is....................7
The device number is............ODD
The physical cylinder is........268
The physical head is............28
```

Obtain the detailed status report using ELAN for the disc subsystem

For GCOS3 systems thru SR2000 GCOS8 the calling sequence for the detailed report is   DE DBV DSK For GCOS8 2300 and above the calling sequence for the detailed report is   DE SE DSK Please enter the menu numbers for the error messages that have been printed.  The numbers you enter must be separated by blanks.

Please select one of the following:

```
 1 MSU500_00_00   2 MSU500_00_01   3 MSU500_00_02   4 MSU500_00_03
 5 MSU500_00_20   6 MSU500_01_00   7 MSU500_01_40   8 MSU500_02_01
 9 MSU500_02_02  10 MSU500_02_10  11 MSU500_02_20  12 MSU500_02_40
13 MSU500_03_01  14 MSU500_03_02  15 MSU500_03_04  16 MSU500_03_10
17 MSU500_03_20  18 MSU500_04_00  19 MSU500_04_01  20 MSU500_04_02
21 MSU500_04_04  22 MSU500_04_10  23 MSU500_04_20  24 MSU500_04_XX
25 MSU500_05_01  26 MSU500_05_02  27 MSU500_05_04  28 MSU500_05_10
29 MSU500_11_XX  30 MSU500_12_01  31 MSU500_12_02  32 MSU500_12_03
33 MSU500_12_13  34 MSU500_12_14  35 MSU500_12_15  36 MSU500_12_16
37 MSU500_13_01  38 MSU500_13_02  39 MSU500_13_03  40 MSU500_13_04
41 MSU500_13_10  42 MSU500_13_11  43 MSU500_13_12  44 MSU500_13_16
45 MSU500_13_21  46 MSU500_13_22  47 MSU500_13_23  48 MSU500_13_24
49 MSU500_13_25  50 MSU500_13_26  51 MSU500_13_27  52 MSU500_13_42
53 MSU500_15_01  54 MSU500_15_02  55 MSU500_15_03  56 MSU500_15_04
57 MSU500_16_XX  58 MSU500_17_XX
```

How many error messages do you wish to enter?

???1

Please enter 1 error message.

???10

Is the PACK UNSAFE BIT SET (byte 4 bit 2) and INHIBIT HDA
RECYCLE NOT set (byte 6 bit 6)  (from POLTS extended status or
ELAN)
                    OR
Are both the Device Fault lamp and the Check LED on? AND pin
17b, slot A?B30 a logic ZERO (NOT INHIBIT HDA RECYCLE)

Y -> YES
N -> NO
U -> UNKNOWN
???Y

In DS4, is bit 1 (access check) SET?
                    OR
Is pin 46A slot 27 a logic ONE?
                    OR
Is there a modified trap board in slot 19 and it indicates an
access check error?

Y -> YES
N -> NO
U -> UNKNOWN
???N

Is either DS2 bit 3 (multi head select) or DS2 bit2 (loss of AC
write current) SET?
OR are head select problems suspected because of other test
results?

Y -> YES
N -> NO
U -> UNKNOWN
???U

In DS4, is bit 0 (read or write servo off track) SET?

Y -> YES
N -> NO
???Y

Replace the following:

board A/B28
    board A/B17
    board A/B21
    board A/B06
    board A/B27
    board A/B26
    board A/B16
    board A/B15

```
Did this action fix the problem?

Y -> YES
N -> NO
???Y

Problem was fixed

The cause/effect chain was:

MSU500_02_10
MSU500_PackUnsafeProblems
MSU500_ReadDrWriteServoOffTrack

T -> Troubleshooting
I -> Interpreter (extended status/media errors)
M -> Media Repair & Recovery
H -> HDA Checkout Procedure
O -> Observed HDA Problems
F -> Fault Dictionary
W -> Write Permission
P -> Pcopy
A -> Address Conversion
C -> Servo Checkout Routine

???Q

Are you sure you want to quit? (Y/N) ?Y
```

Those skilled in the art will appreciate the significance of the fact that the system handled the "unknown" response with the consultation proceeding (rather than aborting) and resulting in a satisfactory diagnosis. The manner in which the system processed the "unknown" response may best be appreciated with reference to the detailed flow chart of the relevant portion of the program presented in FIG. 8. In the process, a simple "stack" (initially empty) and a "closed list", a list of daughter nodes previously examined, or visited, while examining a parent node of the current node which did not provide a solution to the problem, or error, to be solved, or whose prerequisites were not met, are accessed and updated from time to time.

Figure 8:
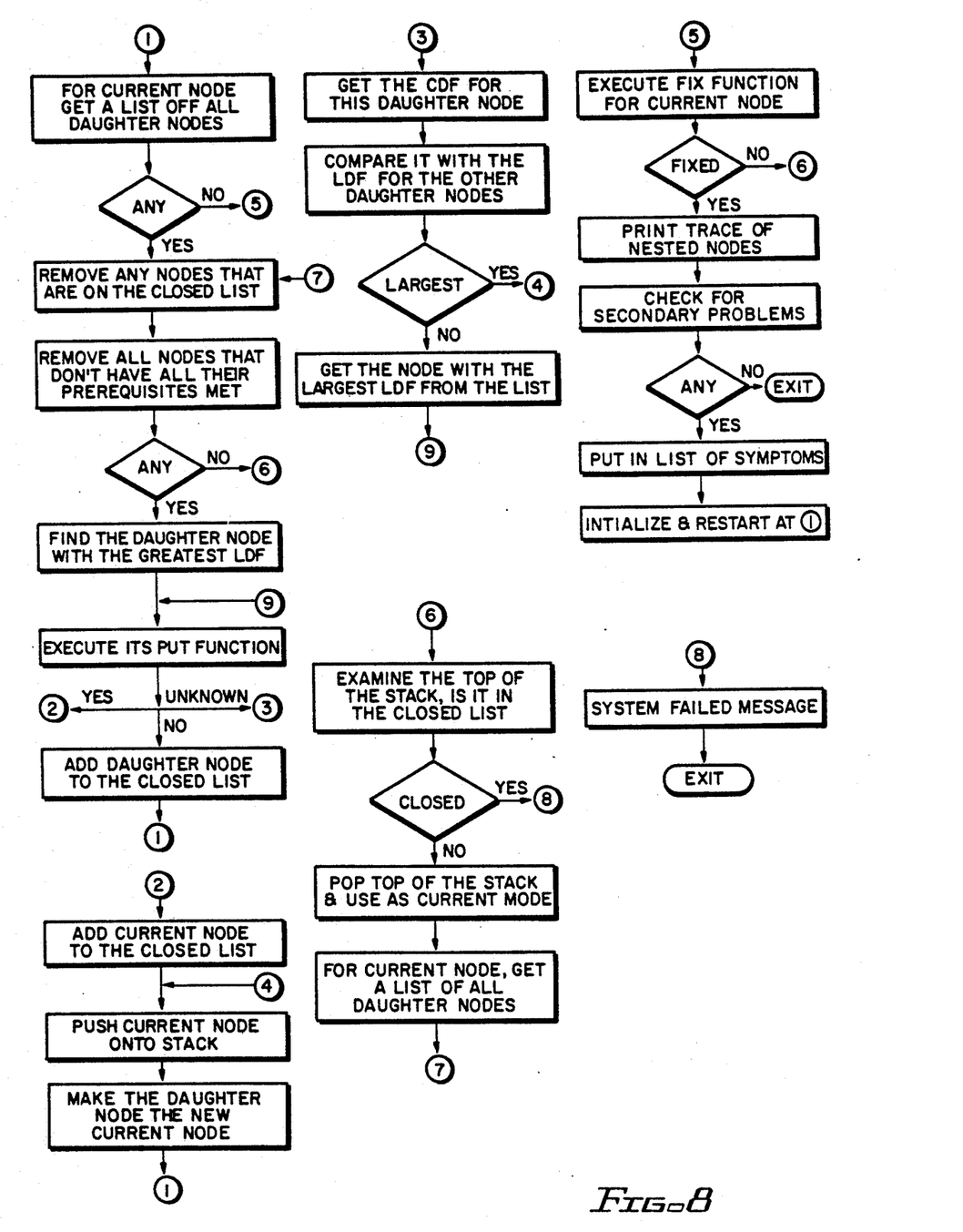
FIG. 8 is a detailed flow chart illustrating the systems handling of an "unknown" response to a question posed during consultation.

Thus, entry is at point "1" at which a list of all daughter nodes for the current node is obtained. If there are no daughter nodes for the current node, the flow moves to point "5", and the "fix" function for the current node is tried. If it is successful, a trace of the nested nodes is printed for documentation, and a determination is made as to whether or not there are any secondary problems. If not, an exit is made. If problems remain, the symptoms are entered, and the flow returns to point "1".

If there are daughter nodes for the current node (which is the usual case), the closed list is examined, and any daughter nodes appearing in the closed list are eliminated. Similarly, any daughter nodes which don't have all their prerequisites met are eliminated, or added to the closed list. If there are no daughter nodes remaining, flow is transferred to point "6" in which the node present at the top of the stack is examined to see if it is on the closed list. If it is, the system has failed to identify the cause of the problem, and the flow moves to point "8" to print a message to that effect and exit.

If the node present at the top of the stack is not on the closed list, it becomes the current node, a list of its daughter nodes is obtained, and flow is transferred to point "7" to check this new list of daughter nodes, and those on the closed list and those whose prerequisites have not been met are eliminated as previously described.

Assuming that daughter nodes remain, the daughter node with the largest local decision factor (LDF) is selected, and its test function is executed with three responses possible: "yes", "no" and "unknown".

If the answer is "no", the daughter node is added to the closed list, and flow returns to point "1".

If the answer is "yes", flow is directed to point "2", the current node is added to the closed list and pushed onto the top of the stack, the daughter node is made the new current node, and flow returns to point "1".

If the answer is "unknown", flow is directed to point "3", and the collapsed decision factor (CDF) for that daughter node is obtained and compared with the LDFs for all the other daughter nodes for the current node. If it is larger, flow is transferred to point "4", the current node is pushed onto the top of the stack, the daughter node is made the new current node, and flow returns to point "1". If it is not larger, the daughter node of the current node having the largest LDF is selected and flow is transferred to point "9", the test function of the selected daughter node is executed to again present a "yes", "no", "unknown" choice to the user. The process then continues until there is a successful or unsuccessful exit via points "5" and "8", respectively.

Figure 9:
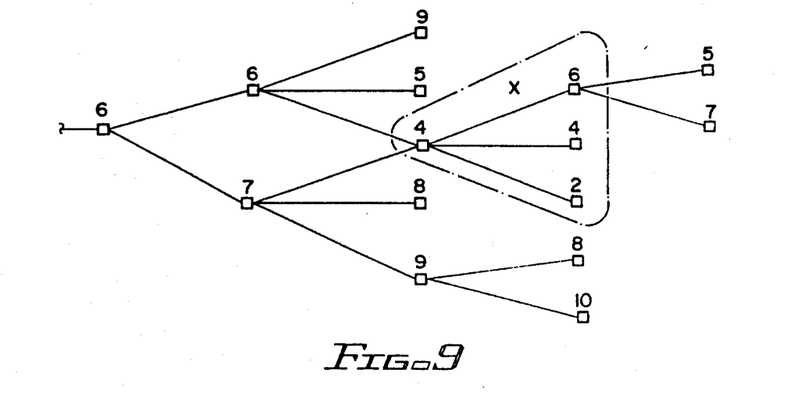
FIG. 9 illustrates the calculation process for obtaining each node's collapsed decision factor which contributes to the flow path selection for handling an "unknown" response.

It will be appreciated that the LDF and CDF values for each node are important considerations in the operation of the system when handling processing of "unknown" responses as set forth above. The calculation process for obtaining each node's CDF is illustrated in FIG. 9. Starting at the end nodes, the LDFs for each node, a function of the certainty and the impact, are assigned as previously described. (The CDFs for terminal nodes are the same as their LDFs.) For each nonterminal node, its CDF is the average of the CDFs for all its daughter nodes. Thus, for the area marked "X", the CDF is $((6+4+2)/3) \rightarrow 4$. The CDF calculations proceed from the bottom of the graph to the top. At any given node, the CDF gives the expected value of the graph below it.

Figure 10:
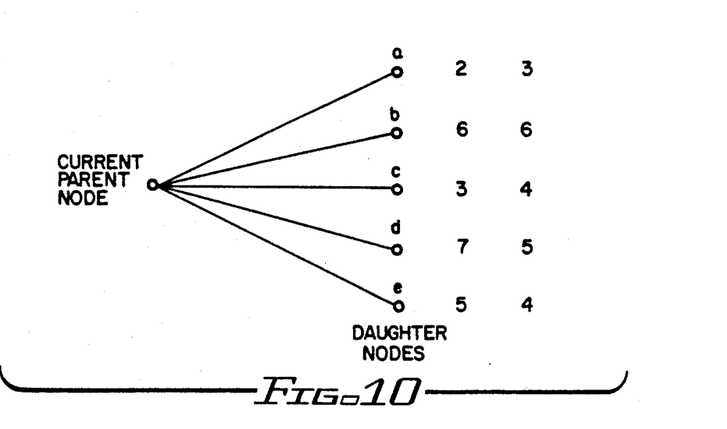
FIG. 10 illustrates a single transition example of a network search.

FIG. 10 illustrates a single transition example of a network search. The sequence in which the daughter nodes will be visited during the search is; d, b, e, c and a; i.e., according to their respective LDFs. However, if the user enters an "unknown" response at node d, then node b will be visited in place of node d since node b's LDF is larger than node d's CDF. Node d will be visited again later if necessary.

While the subject methodology for processing "unknown" responses in a diagnostic expert system has been illustrated in the environment of a system for troubleshooting electronic equipment, those skilled in the art will understand that it has broad general applicability in diagnostic expert systems.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a diagnostic expert system for solving a problem incorporating a cause-effect graph having a plurality of nodes and in which "yes", "no" and "unknown" are valid possible responsive inputs to a query, the method for processing in a computer which includes the following steps:
    (A) assign to each node in the cause-effect graph a local decision factor based on a given node's desirability for selection during a best-first search of the cause-effect graph;
    (B) assign to each node in the cause-effect graph a collapsed decision factor based on the values of the local decision factors for all daughter nodes of a current node; and
    (C) for the current node under examination having daughter nodes:
        (1) obtain a first list of all of the current node's daughter nodes;
        (2) examine the first list of daughter nodes and remove from the first list all daughter nodes on a closed list, a list of daughter nodes that have been visited before in examining a parent node of the current node which did not provide a solution to the problem, or whose prerequisites were not met;
        (3) remove from the first list all daughter nodes which have prerequisites that are not met, and add them to the closed list;
        (4) from the daughter nodes remaining on the first list, choose the daughter node with the largest local decision factor; and
        (5) identify a test function to be executed for the chosen daughter node, and query the result of executing the identified test function;
            (a) if the responsive input to a query produced in executing step (5) is a "yes", make the chosen daughter node the current node and return to step (C);
            (b) if the responsive input to a query produced in executing step (5) is a "no", delete the chosen daughter node from the first list and add it to the closed list and return to step (C); and
            (c) if the responsive input to a query produced in executing step (5) is an "unknown", compare the chosen daughter node's collapsed decision factor with the local decision factors for the other daughter nodes of the first list for the current node of the first list and which have their prerequisites met; and
                (i) if the collapsed decision factor of the chosen daughter node is larger than the local decision factors of the other daughter nodes of the list, make the chosen daughter node the current node and return to step (C); and
                (ii) if the collapsed decision factor of the chosen daughter node is not larger than the local decision factor of all of the daughter nodes of the first list, then choose the daughter node with the largest local decision factor and return to step (5).

2. The diagnostic expert system of claim 1, in which, in step (B), a given node's collapsed decision factor is determined by averaging the local decision factors for all its daughter nodes.

3. The diagnostic expert system of claim 1 in which, in step (B), if a given node is a terminal node, its collapsed decision factor is made equal to its local decision factor.

4. The diagnostic expert system of claim 2 in which, in the event that a given node is a terminal node such that there are no daughter nodes to average, its collapsed decision factor is made equal to its local decision factor.

* * * * *